(12) United States Patent
Smaldone et al.

(10) Patent No.: US 11,513,912 B2
(45) Date of Patent: Nov. 29, 2022

(54) APPLICATION DISCOVERY USING ACCESS PATTERN HISTORY

(71) Applicant: EMC IP Holding Company LLC, Hopkinton, MA (US)

(72) Inventors: Stephen D. Smaldone, Woodstock, CT (US); Arieh Don, Newton, MA (US); Owen Martin, Hopedale, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 73 days.

(21) Appl. No.: 16/825,268

(22) Filed: Mar. 20, 2020

(65) Prior Publication Data

US 2021/0294700 A1    Sep. 23, 2021

(51) Int. Cl.
*G06F 16/00* (2019.01)
*G06F 11/14* (2006.01)
*G06F 16/23* (2019.01)
*G06F 16/25* (2019.01)
*G06F 16/21* (2019.01)

(52) U.S. Cl.
CPC ........ *G06F 11/1464* (2013.01); *G06F 16/219* (2019.01); *G06F 16/2365* (2019.01); *G06F 16/254* (2019.01); *G06F 2201/805* (2013.01)

(58) Field of Classification Search
None
See application file for complete search history.

(56) References Cited

U.S. PATENT DOCUMENTS

| | | | |
|---|---|---|---|
| 9,015,122 B2* | 4/2015 | Harrison | G06F 11/1453 707/646 |
| 2003/0217008 A1* | 11/2003 | Habegger | G06Q 10/10 705/51 |
| 2004/0049475 A1* | 3/2004 | Kidokoro | G06F 16/93 |
| 2014/0189032 A1* | 7/2014 | Sugimoto | H04L 67/1097 709/212 |
| 2014/0289241 A1* | 9/2014 | Anderson | G06F 16/48 707/736 |

* cited by examiner

*Primary Examiner* — Bai D Vu
(74) *Attorney, Agent, or Firm* — Workman Nydegger

(57) ABSTRACT

Application discovery from access patterns is disclosed. Access histories from multiple servers are collected and stored at a warehouse, which may be part of a data protection system. A time series analysis is performed on the access history to identify consistency groups and applications from the perspective of devices and storage arrays. Data protection operations such as backup operations can then be performed on the basis of devices or storage in storage arrays or other arrangements that pertain to specific consistency groups or to specific applications.

20 Claims, 6 Drawing Sheets

APPLICATION DISCOVERY USING ACCESS PATTERN HISTORY

FIELD OF THE INVENTION

Embodiments of the present invention generally relate to data protection operations. More particularly, at least some embodiments of the invention relate to systems, hardware, software, computer-readable media, and methods for data protection operations including automatic application discovery operations and backup operations using access patterns.

BACKGROUND

Applications and data are a core aspect of many computing systems. As a result, care is taken to ensure that the applications and data are protected. However, the manner in which applications and data are stored has evolved and protecting applications and data must also evolve. Applications and their data, for example, may be distributed across multiple servers and their data/state can be stored in multiple devices across multiple storage arrays.

Distributed applications can be difficult to backup because of their distributed nature. In fact, the distributed nature of these applications makes it difficult to perform backup operations efficiently. More specifically, even assuming that a storage array is able to identify data that has changed, the storage array has no way to associate the changed data with a specific application. One consequence is that backup systems may be required to process data that is not specifically associated with an application. Further, more data than necessary may be backed up. Thus, backing up applications such as distributed applications can be inefficient.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
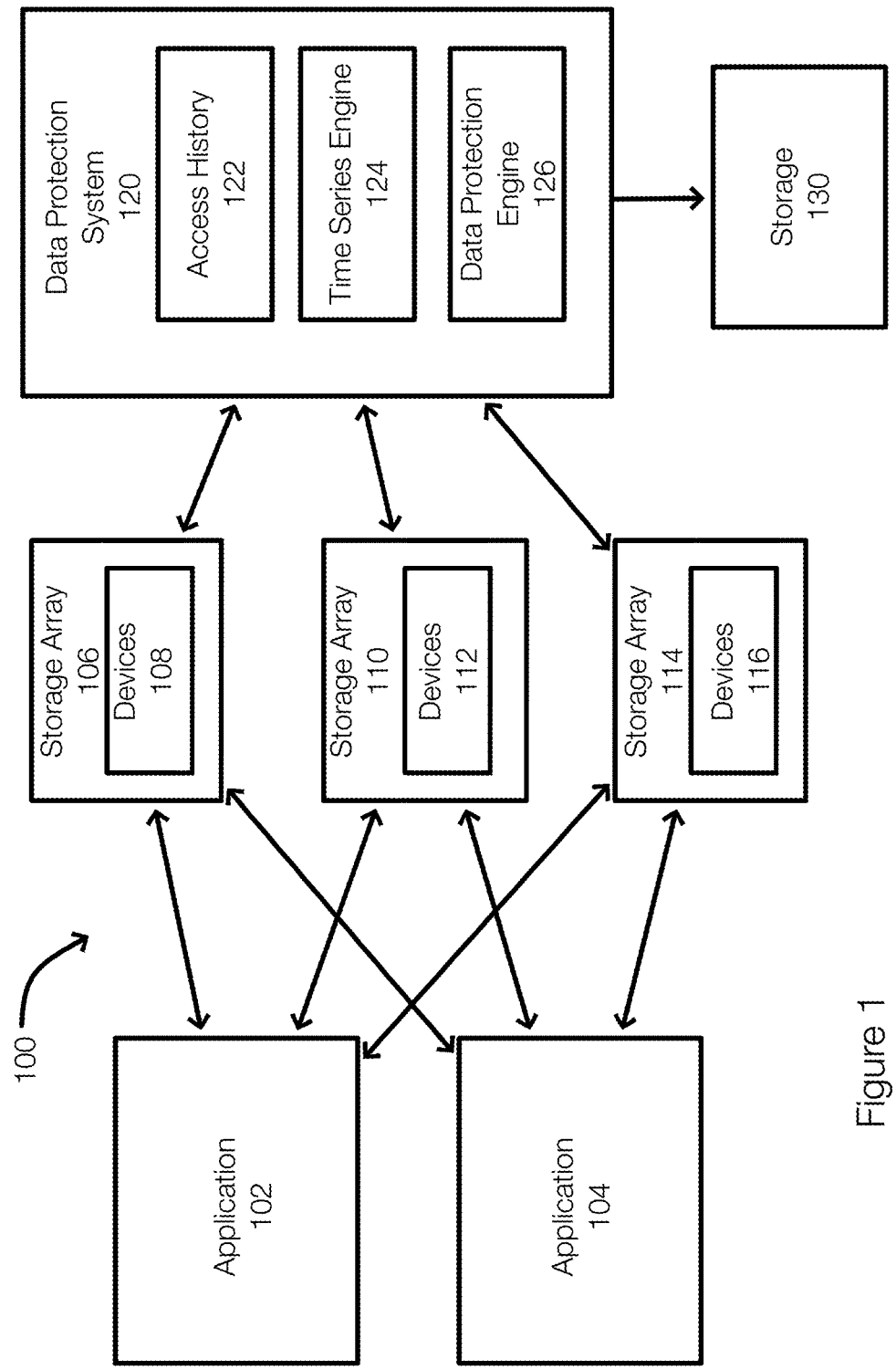
FIG. 1 discloses aspects of a data protection system configured to perform data protection operations for an application such as a distributed application.

Embodiments of the present invention generally relate to data protection operations. More particularly, at least some embodiments of the invention relate to systems, hardware, software, computer-readable media, and methods for performing data protection operations such as backup operations, restore operations, application detection operations, consistency group formation or detection operations or the like or combination thereof.

In general embodiments of the invention relate to data protection operations such as application discovery using IO (Input/Output) access patterns. Applications are often implemented as distributed applications and may involve multiple servers. Distributed applications can run on multiple computers within a network at the same time. Distributed applications can be implemented in environments including cloud environments.

When an application such as a distributed application performs IO operations, the history of these operations (access history) is tracked and stored at least at a server level. In other words, each server maintains its own access history. As a result, the access history of one server may be different from the access history of another server even though the servers are part of the same application. These histories can be aggregated and analyzed to identify how the application (or its servers) interacts with specific storage arrays and with specific devices within those storage arrays.

Over time, the access history allows the devices associated with an application and with individual servers of the application to be identified. This allows a data protection system, when for example performing a backup operation, to efficiently perform the backup operation by backing up only the devices or data associated with the application rather than the entire storage array.

More specifically, storage direct backups may only be aware of block based devices (LUNs—Logical Unit Numbers) or other storage types. However, system administrators often want to backup applications. In these types of situations, the storage arrays are unable to provide any information regarding which servers performed accesses or regarding which servers may be part of the same application. Rather, the storage array is only able to identify block changes. Changes could also be tracked in terms of objects or files for example.

As previously stated, distributed applications may be spread across multiple servers and their data and/or state may be stored in multiple LUNs across multiple storage arrays. Embodiments of the invention relate to an automated process that associates these block devices (or more specifically block changes) to an application even when the application is running on distributed servers and using multiple storage arrays.

Conventionally, a backup server is deployed and the backup server may mount a copy of the data to an application on the backup server. The backup server reads the data blocks associated with the application and sends the data via sFTP (secure file transfer protocol) or any other similar methodology for backup. However, this methodology does not allow incremental portions (e.g., the changed blocks associated with the applications) of the data to be sent in part because the storage arrays are application agnostic. The process may become inefficient because the backup server is required to process more data than necessary to back up an application. Embodiments of the invention advantageously overcome this inefficiency.

Embodiments of the invention are able to improve the manner in which data protection operations are performed by associating changed blocks or devices with specific applications. By analyzing the access histories associated with servers accessing the storage arrays, embodiments of the invention can identify consistency groups (devices that should be backed up together) and application groups (which allows the entire application to be backed up at the same time). This allows data protection systems or data protection servers to associate specific changed blocks or data or devices with the application that generated or is associated with those changes. This reduces the amount of data to be processed and makes the data protection operations more efficient.

When applications update their data or state on a storage array, these updates often occur in deterministic patterns. For example, a user may click "Buy Now" on a web page. The web server, in response to the click, updates server logs and then sends the transaction to the database (DB) server. The DB server updates application tables and relevant server logs. Embodiments of the invention use the manner in which devices or storage arrays are accessed (access history) to identify these types of patterns. Detecting these types of patterns from the access histories allows storage arrays and specific devices within storage arrays to be associated as consistency groups and/or as applications. In fact, this allows devices in different storage arrays to be associated in consistency groups and/or application groups. Because applications and servers often cross storage arrays (i.e., use different storage arrays at the same time), embodiments of the invention allow an application to be backed up as a whole by identifying all devices across multiple storage arrays that pertain to the same application.

FIG. 1 illustrates an example of an environment in which data protection operations are performed. More specifically, a computing system 100 is an example of a system in which data protection operations such as backup operations, consistency group discovery, and application discovery operations are performed. The computing system 100 includes appropriate hardware (processors, memory, networking hardware) and applications may operate on the hardware.

FIG. 1 illustrates applications 102 and 104. During operation, each of the applications 102 and 104 may perform IOs to storage arrays, represented as storage arrays 106, 110 and 114. Each of the storage arrays 106, 110 and 114 is associated with devices (LUNs in this example). The storage arrays 106, 110, and 114 are associated with, respectively, devices 108, 112 and 116. The devices 108, 112, and 116 may be block based devices (LUNs). However, embodiments of the invention may also be applied to other storage such as object-based storage, file based storage, data stream based storage, or the like.

FIG. 1 illustrates a data protection system 120 that is configured to perform data protection operations with respect to the applications 102 and 104 (and/or servers or consistency groups associated with the applications). The data protection system 120 may be configured to generate backups of the applications 102, 104 and/or their data or state from the storage arrays 106, 110 and 114. Generally, backing up an application includes backing up sufficient information to allow the application to be restored.

Figure 2:
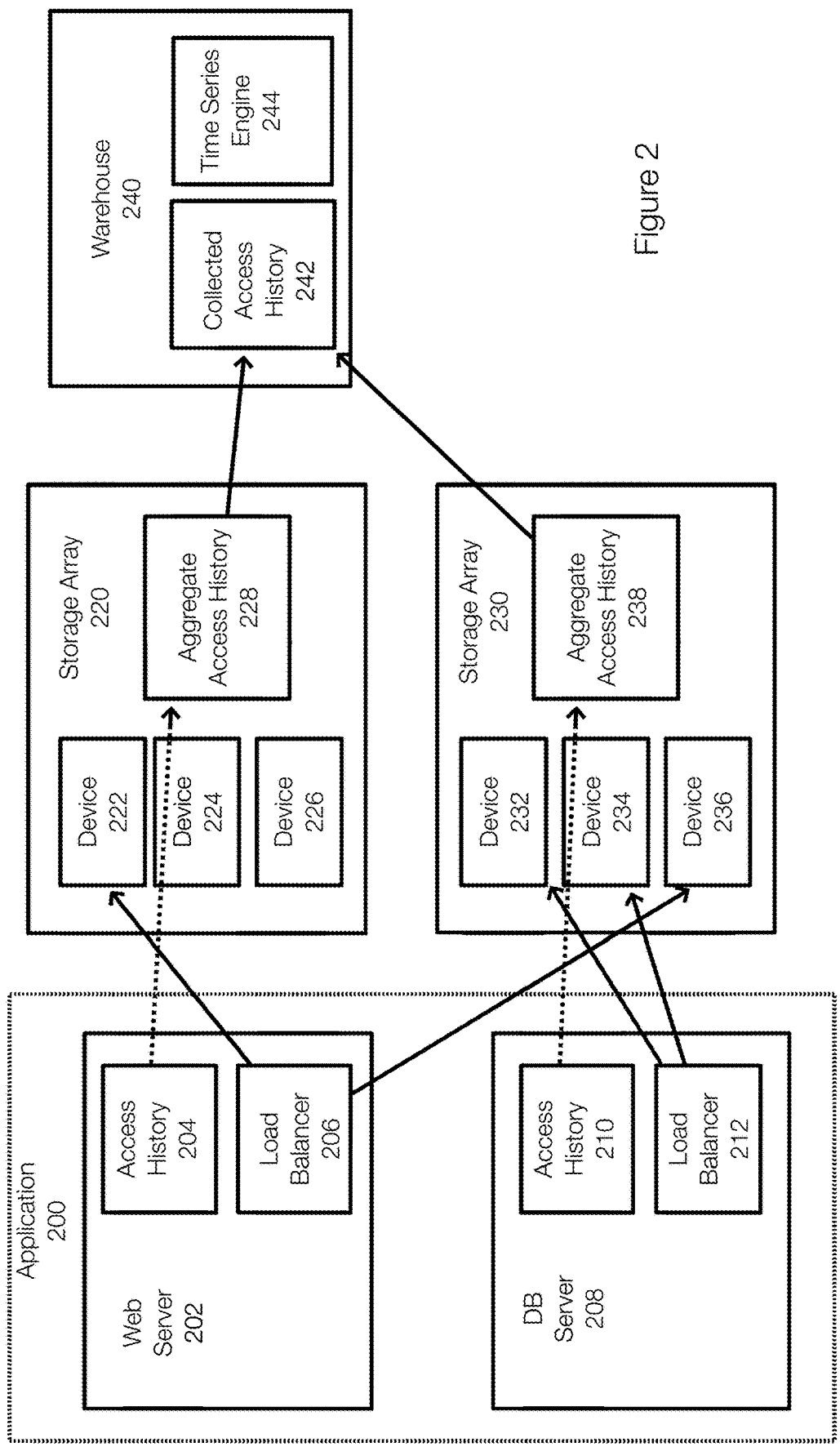
FIG. 2 discloses aspects of a data protection system operating in a computing network that is configured to collect and analyze access histories associated with storage arrays.
Figure 3:
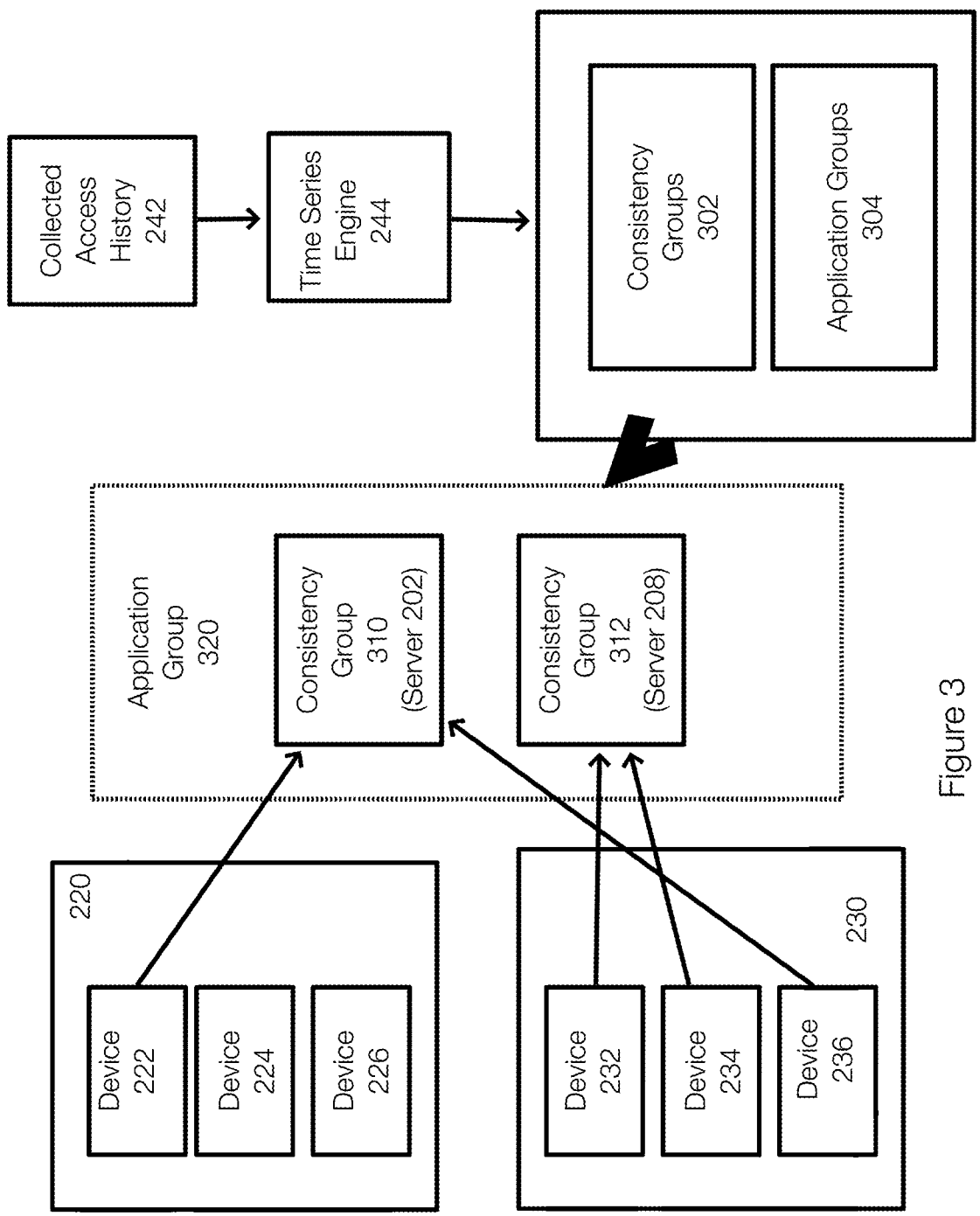
FIG. 3 illustrates an example of a data protection system configured to identify consistency groups and application groups from access histories.

The data protection system 120 may store an access history 122, which is described in more detail at least with respect to FIGS. 2 and 3. Generally, the access history 122 includes data that represents IOs to the devices 108, 112, and 116. The access history 122 may or may not include information about which application/server performed the accesses.

A time series engine 124 processes or analyses the access history 122 to generate results that reflect which of the devices 108, 112, and 116 are associated with the applications 102 and/or 104. For example, the time series engine 124 may determine that the application 102 typically interacts only with the devices 108 and 112. As a result, a backup operation performed by the data protection engine 126 of the data protection system 120 may only need to store copies of the changed blocks or changed data associated with the devices 108 and 112. The need to protect changes on the devices 116 (from the perspective of the application 102) is eliminated and avoided. Backup operations can be of various types, including snapshot, journaled, full, incremental, or the like.

The data protection engine 126 may store the backups and the access history 122 in storage 130. The access history 122 can be stored indefinitely. Over time, however, the access history 122 may be thinned and older data may be deleted. For example, data older than a predetermined period may be thinned by only keeping the daily history for a certain day of the week. Thus, the granularity may change for older data. At some point, the access history or portions thereof may be deleted if desired.

FIG. 2 illustrates an example of an application operating in a computing system. In this example, an application 200 may include a web server 202 and a database (DB) server 208. The web server 202 may be associated with a load balancer 206 (e.g., MPIO (multi-path IO) framework or other protocol). As IOs are performed by the web server 202, the IOs handled by the load balancer 206 are recorded in an access history 204.

The access history 204 is an example of a local access history. Periodically, the access history 204 is transferred to an aggregate access history 228 associated with the storage array 220. In this example, the web server 202 has IOs with the storage array 220 and the storage array 230. The portion of the access history 204 relevant to the storage array 220 is sent to the storage array 220 and stored in the aggregate access history 228. The portion of the access history 204 relevant to the storage array 230 is sent to the storage array 230 and stored in the aggregate access history 238.

Similarly, the load balancer 212 associated with the DB server 208 is periodically (or based on another schedule) transferred to the aggregate access history 238. In one example, the access history of a server may only be transferred to a single aggregate access history. However, the access history can be sorted by storage array and the relevant portions are sent to each storage array.

The aggregate access history 228 and 238 may each store access histories from a plurality of servers, which may or may not be part of the same application. The aggregate access histories 228 and 238 are also collected and stored as the collected access history 242 in a warehouse 240, which may be associated with a data protection system. Thus, the collected access history 242 includes the access histories associated with, potentially, multiple applications, multiple servers, and multiple storage arrays.

The warehouse 240, which may be part of a data protection system, may include or be associated with a time series engine 244 that is configured to perform analysis on the collected access history 242 (also referred to as access history). The time series engine 244 then generates outputs including consistency groups and application groups. In other words, the time series engine 244 is able to identify which devices should be included in the same consistency groups (a grouping that is server based) and devices which should be included or associated with an application (a grouping that is application based).

FIG. 3 illustrates an example of the output of a time series engine. FIG. 3 illustrates that the time series engine 244 takes, as input, the collected access history 244 and generates output that includes or identifies consistency groups 302 and application groups 304. This output can be used by a data protection system when performing data protection operations such as backup operations. Rather than backing up all devices in one or more storage arrays to protect an application, embodiments of the invention can backup only the devices in the storage arrays that are included in the consistency groups of an application or that are in an application group. The data protection application could also back up specific consistency groups or servers that cross or are associated with multiple storage arrays.

With reference to FIGS. 2 and 3, the application 200 includes a web server 202 that interacts with devices 222 and 236. The web server 202 does not have IOs with respect to the devices 224, 232, and 234. The DB server 208 interacts with the device 232 and 234 but does not have IOs with respect to the devices 222, 224, 226, and 236.

Returning to FIG. 3, the analysis of the collected access history 242 indicates that the consistency groups 302 includes a consistency group 310 that is associated with the server 202 and includes the device 222 and 236. The time series analysis also indicates that the consistency groups 302 includes a consistency group 312 associated with the server 208 that includes the devices 232 and 234.

The time series analysis is also able to identify or determine that the application group 320 includes the consistency groups 310 and 312 and thus includes the devices 222, 232, 234 and 236. When performing a backup operation, the data protection system may only need to protect changes at the devices associated with the application group 320. Of course, backup operations can also be performed with respect to consistency groups as well.

The following discussion discusses the access history in more detail. As previously discussed, the servers perform IOs with various devices. The load balancer on each server is configured to collect and temporarily save an access history in a local buffer. For example, the load balancer may collect, for each IO:

LUN (Logical Unit Number) or a device identifier in a storage array;
    an operation (e.g., read, write);
    LBA (Logical Bit Address);
    Host identifier;
    Application identifier;
    and the like or combination thereof.

Other information such as a timestamp, if available, may be collected.

More generally, the load balancer may collect information that is available. In addition, the load balancer may send this type of information based on the executable that generated the IO. This may all more than one of the various pieces of information to be send for the same device based on the executables that generated the IOs.

The local access histories of the servers may be sent to the storage arrays. Each storage array will aggregate the access histories from multiple servers and send the aggregated access histories for the LUNs or devices to a centralized warehouse (e.g., CLM-cloud lifecycle management).

Thus, the warehouse maintains a full history of all access patterns collected by associated storage arrays. Analytical techniques (ARIMA, Spectrum Analysis, etc.) can be deployed on the collected access histories stored in the warehouse to identify and correlate access patterns in the historical access histories. The correlated access patterns allow consistency groups (LUNs that should be backed up together) to be identified and application groupings (servers that should be backed up together) to be identified.

The consistency groups are provided back into the storage arrays. This allows the storage arrays to identify the devices or LUNs that belong to an application. In addition the identification of consistency groups can be provided to the storage arrays as a newly learned management object. This allows the storage arrays to enforce or implement specific data protection policies. For example, the web server may be backed up at one rate (e.g., hourly) while everything else may be backed up at a different rate (e.g., daily).

In one example, the storage arrays can track changes to each device or LUN. Once the consistency groups and application groups are known, variations or improvements to data protection strategies can be deployed. More specifically, the storage arrays can push blocks with changes to the data protection system (e.g., a backup server, a backup appliance). As previously stated, the management objects can be used to push blocks with changes according to relevant policies. These blocks can then be backed up based on how the blocks correlate to applications or consistency groups.

Embodiments of the invention allow consistency groups and distributed applications that are associated with different storage arrays to be identified and protected.

Figure 4A:
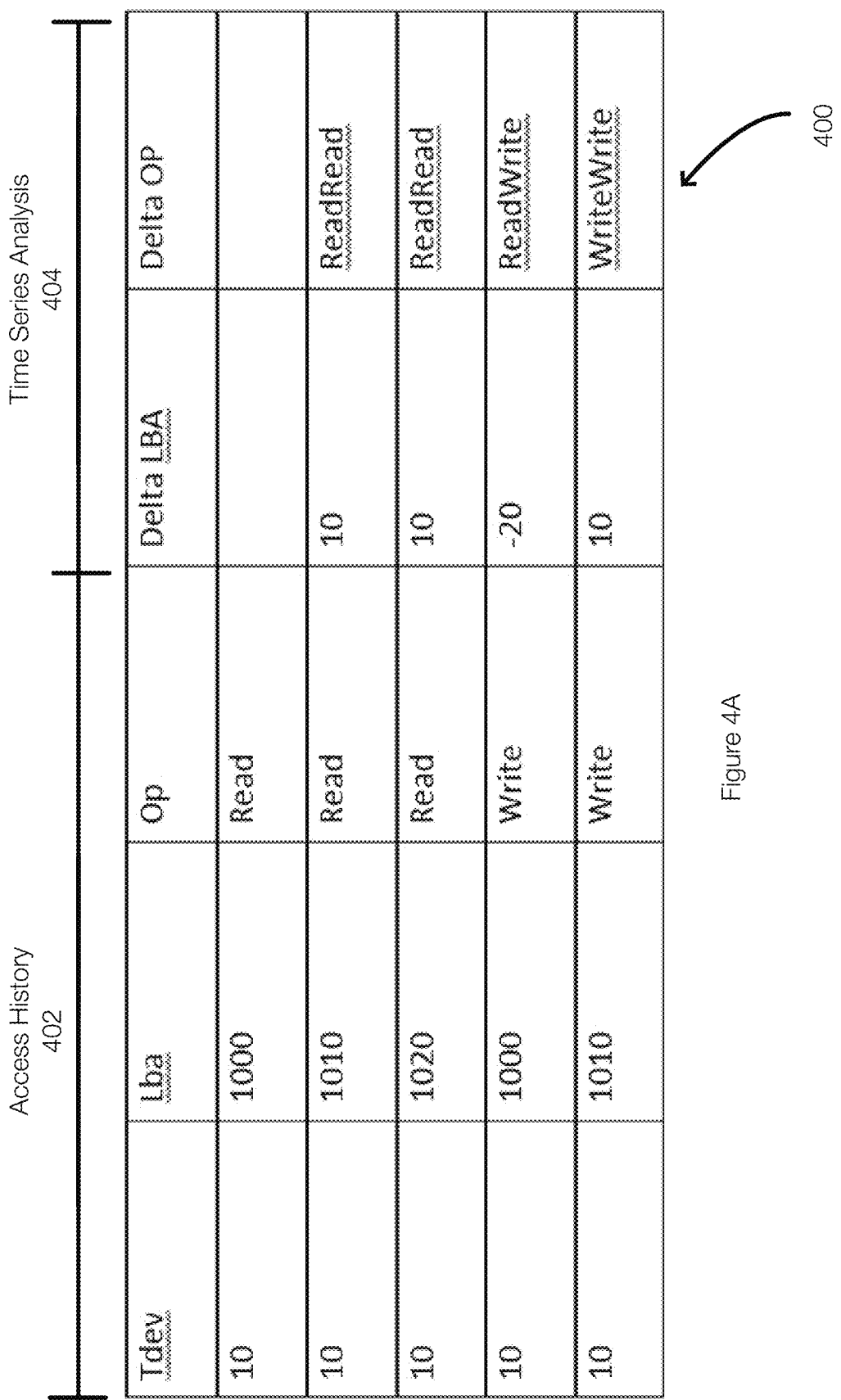
FIG. 4A illustrates an example of an access history and an example of an analysis of the access history.

FIG. 4A illustrates an example of an access history and also illustrates some of the analysis that may be performed by the time series engine. In one example, the access history includes IOs that are generated over time. As a result, the IOs represent data points that can be analyzed using time series techniques. The table 400 illustrates an access history 402. In this example, each IO in the access history 402 is associated with the following metadata: Tdev (or LUN or device number), LBA (Logical Block Address), and Operation. The table 400 also illustrates data generated from the access history for use in time series analysis. More specifically, the table 400 illustrates some of the data that may generated during a time series analysis. The time series analysis 404 includes a Delta LBA, and a Delta Operation. The delta LBA and the Delta operation are derived from the access history.

In this example, the delta LBA is calculated as a difference between the LBA of the last IO for the device and the next IO the device is about to schedule. Then, the top N per delta operation are kept, where the delta operation is defined as the concatenation of two compared IO types. This result is illustrated in the time series analysis 404. The data included in the table 400 allows emerging patterns to be discovered and analyzed.

As previously stated, the access history may include a large amount of IOs. In one example, a fixed amount of IOs may be collected for a given sample. The sample can be fixed from the perspective of a number of IOs or an amount of time. For example, 1 million records or 1 minute of clock time may corresponds to a sample.

For each row in the access history, the delta calculation may be performed as illustrated in the time series analysis 404. This may be represented as a histogram. For example, the histogram may illustrate a total number of Read Read ReadRead+10, ReadWrite−20, WriteWrite+10, or the like.

There are usually thousands of permutations and embodiments of the invention may evaluate the most frequent permutations.

Figure 4B:
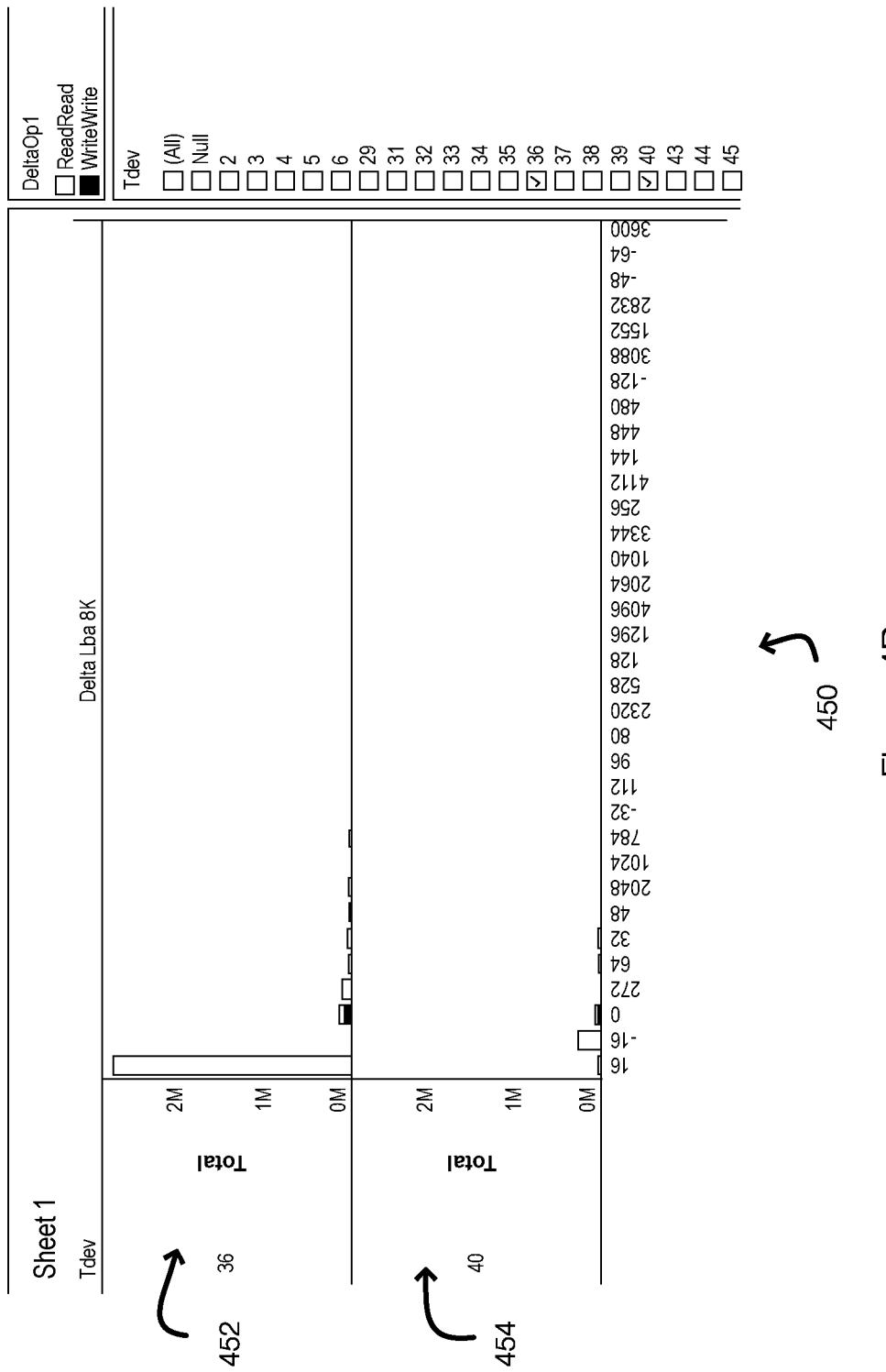
FIG. 4B illustrates an example of a histogram that identifies the most common occurrences or patterns in a sample of access history.

FIG. 4B illustrates an example of a histogram. FIG. 4B illustrates two LUNS (36 and 40). The Y axis is the total count and the X axis is the delta LBA. At 452, the most frequent occurrence for the LUN 36 is ReadRead16 followed by WriteWrite0. At 454, the most frequent occurrence for the LUN 40 is a ReadRead16. This demonstrates that the applications can be clustered based on the dominant behavior of the deltalba and the long tail can be ignored in one example.

More specifically, the time series analysis 404 for a specific device or storage array may be used to identify patterns that can be correlated with patterns associated with another device or another storage array. The time series analysis 404, in one example, may be viewed as a fingerprint or a pattern. Within the access history 402, this pattern may repeat itself over time. This pattern can be correlated with other fingerprints or patterns in the access histories of other devices or storage arrays.

Consider the example previously discussed where, in response to a user clicking a "Buy Now" button, the web server updates logs in a device. When load balancing, a similar update occurs for multiple buyers and may occur on different devices. However, the fingerprint should be the same. As illustrated in FIG. 2, the load balancer 206 may perform IOs to the device 222 and the device 236. This results in a similar pattern with respect to two devices in different storage arrays. Recognizing this pattern may allow the devices 222 and 236 to be grouped as a consistency group with respect to the server 202.

When considering the transactions of the web server 202 and the transactions of the DB server 208, this results in patterns that span different servers and different devices and/or storage arrays. For example, the time series engine 244 may detect a pattern where IOs associated with updating the server logs by the web server are closely followed by IOs associated with updating application tables by the DB server.

By detecting a correlation or pattern, this allows devices associated with different servers to be correlated. In other words, an application group can be identified based on a time series or pattern analysis included in the access history 402.

When evaluating the access history including delta operation type and identifying consistency groups and applications, a cumulative frequency distribution may be used, which relates to a running total percentage of IO per delta operation type.

Figure 5:
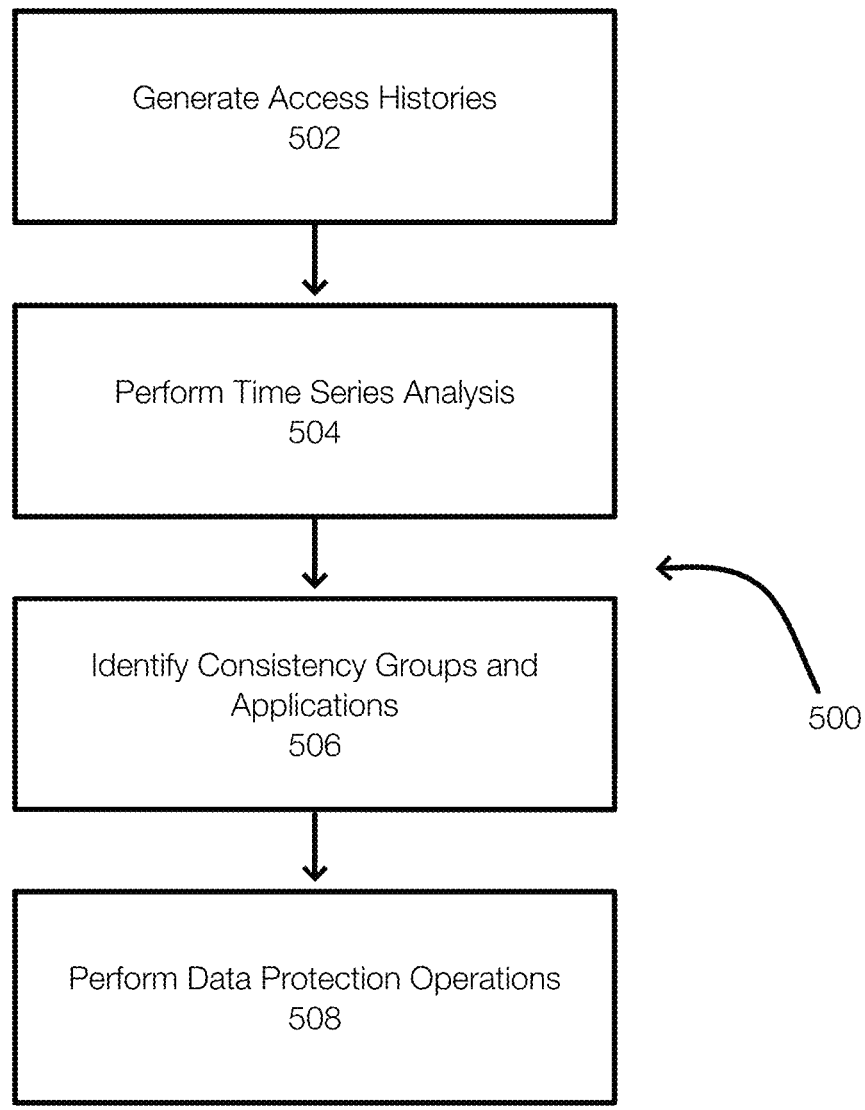
FIG. 5 illustrates an example of a method related to data protection operations such as backing up an application or a consistency group or identifying consistency groups and/or application groups.

FIG. 5 illustrates an example of a method for performing a data protection operation such as determining consistency and/or application groups and backing up consistency and/or application groups. The method 500 includes generating 502 access histories. Generating access histories can include storing local access histories at local servers, aggregating the local histories at the storage array, and generating a final access history, which typically includes the access histories aggregated by the storage arrays.

A time series analysis is performed 504 on the access history (or access histories). This analysis can process the access history to identify fingerprints of certain actions or to identify patterns that occur across multiple devices and multiple storage arrays. By correlating the transactions in the access histories, the IOs can be grouped by server and application. Thus, consistency groups and applications are identified 506.

The identification of consistency groups and applications can be tunable. A tuning factor allows the identification of consistency groups and applications to be tuned. The tuning factor relates to how aggressive the pattern identification is when identifying patterns in the access histories. For example, the tuning factor can be implemented to require that 90% of the IOs be the same. This may be contrasted with a scenario where the tuning factor only requires 50% of the IOs to be the same. This tuning factor impacts the identification of consistency groups and applications. In one example, a newer server may be added to an existing cluster that is running the same webserver and another database or machine learning workload. As a result, the newer server will have a different access profile to its LUNs as a result. The tuning factor can help identify patterns in this scenario.

Next, data protection operations are performed 508. These operations are performed based on the identified consistency groups and/or applications. Data protection operations may include backup operations, policy enforcement operations at the storage arrays, or the like.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. Such operations may include, but are not limited to, data read/write/delete operations, data deduplication operations, data backup operations, data restore operations, data cloning operations, data archiving operations, data application and/or consistency group identification operations and/or disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method comprising generating an access history, wherein the access history includes an access history from each of a plurality of servers, performing an analysis on the access history, identifying storage, from the access history, that correspond to one or more consistency groups and one or more applications, wherein each application includes at least one consistency group, performing data protection applications based on the one or more consistency groups or based on the one or more applications.

Embodiment 2. The method of embodiment 1, further comprising generating, by each server, local access history.

Embodiment 3. The method of embodiment 1 and/or 2, further comprising transmitting the local access history of each server to a corresponding storage array such that the storage array aggregates local access histories from multiple servers.

Embodiment 4. The method of embodiment 1, 2 and/or 3, further comprising the aggregated local history of each storage array to a data warehouse associated with a data protection system, wherein the access history includes the aggregated local histories from each of the storage arrays.

Embodiment 5. The method of embodiments 1, 2, 3, and/or 4, further comprising performing a time series analysis on the access history.

Embodiment 6. The method of embodiments 1, 2, 3, 4, and/or 5, further comprising identifying patterns across storage arrays to identify consistency groups, wherein each consistency group associates one or more storage with a server, and to identify application, wherein each application is associated with one or more storage.

Embodiment 7. The method of embodiments 1, 2, 3, 4, 5, and/or 6, further comprising tuning the analysis with a tuning factor.

Embodiment 8. The method of embodiments 1, 2, 3, 4, 5, 6 and/or 7, further comprising performing a backup operation based on the consistency groups or the application groups.

Embodiment 9. The method of embodiments 1, 2, 3, 4, 5, 6, 7, and/or 8 further comprising identifying fingerprints within the access history, wherein the fingerprints include a delta logical block address and a delta operation type.

Embodiment 10. The method of embodiments 1, 2, 3, 4, 5, 6, 7, 8, and/or 9, further comprising creating a ranked list of a cumulative frequency distribution, which corresponds to a total percentage of IO per delta operation type.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

Embodiment 13. A method or non-transitory storage medium configured to perform any of embodiments 1-12 or portion thereof or elements of any of the Figures disclosed herein.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

In one example, the physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    generating an aggregated access history for servers, wherein the aggregated access history includes a local access history from each of the servers, wherein the aggregated access history tracks IO (Input/Output) operations between the servers and storage devices, wherein the servers are associated with applications;
    determining which of the storage devices were accessed by each of the servers based on an analysis of the aggregated access history to identify consistency groups for each of the applications, wherein the analysis determines which of the applications access which of the storage devices, wherein each of the consistency groups includes storage devices accessed by a corresponding application, wherein each application includes a consistency group, wherein the consistency group of an application includes the storage devices accessed by the application; and performing a data protection operation on each of the applications, wherein the data protection operation is applied to all of the storage devices in the corresponding consistency group of the application, the data protection operation including a backup operation.

2. The method of claim 1, further comprising generating, by each server, the local access history, wherein at least one application is a distributed application that executes on more than one of the servers.

3. The method of claim 2, further comprising transmitting a local access history, by each of the servers, to a corresponding storage array, and aggregating the local access histories at the corresponding storage array, wherein each storage array is associated with an aggregated local history.

4. The method of claim 3, further comprising sending the aggregated local history of each storage array to a data warehouse associated with a data protection system, wherein the aggregated access history at the data warehouse includes the aggregated local histories from each of the storage arrays.

5. The method of claim 1, further comprising performing a time series analysis on the access history.

6. The method of claim 5, further comprising identifying patterns across storage arrays to identify the consistency groups, wherein each of the consistency groups associates one or more of the storage devices with a server, and to identify the applications, wherein each of the applications is associated with one or more of the storage devices.

7. The method of claim 1, further comprising tuning the analysis with a tuning factor.

8. The method of claim 1, further comprising performing a backup operation based on the consistency groups or the applications.

9. The method of claim 1, further comprising identifying fingerprints within the access history, wherein the fingerprints include a delta logical block address and a delta operation type.

10. The method of claim 9, further comprising creating a ranked list of a cumulative frequency distribution, which corresponds to a total percentage of IO per delta operation type.

11. A non-transitory storage medium having stored therein instructions that are executable by one or more hardware processors to perform operations comprising:

generating an aggregated access history for servers, wherein the aggregated access history includes a local access history from each of the servers, wherein the aggregated access history tracks IO (Input/Output) operations between the servers and storage devices, wherein the servers are associated with applications;

determining which of the storage devices were accessed by each of the servers based on an analysis of the aggregated access history to identify consistency groups for each of the applications, wherein the analysis determines which of the applications access which of the storage devices, wherein each of the consistency groups includes storage devices accessed by a corresponding application, wherein each application includes a consistency group, wherein the consistency group of an application includes the storage devices accessed by the application; and performing a data protection operation on each of the applications, wherein the data protection operation is applied to all of the storage devices in the corresponding consistency group of the application, the data protection operation including a backup operation.

12. The non-transitory storage medium of claim 11, the operations further comprising generating, by each server, the local access history, wherein at least one application is a distributed application that executes on more than one of the servers.

13. The non-transitory storage medium of claim 12, the operations further comprising transmitting a local access history, by each of the servers, to a corresponding storage array, and aggregating the local access histories at the corresponding storage array, wherein each storage array is associated with an aggregated local history.

14. The non-transitory storage medium of claim 13, the operations further comprising sending the aggregated local history of each storage array to a data warehouse associated with a data protection system, wherein the aggregated access history at the data warehouse includes the aggregated local histories from each of the storage arrays.

15. The non-transitory storage medium of claim 11, the operations further comprising performing a time series analysis on the access history.

16. The non-transitory storage medium of claim 15, the operations further comprising identifying patterns across storage arrays to identify the consistency groups, wherein each of the consistency groups associates one or more of the storage devices with a server, and to identify the applications, wherein each of the applications is associated with one or more of the storage devices.

17. The non-transitory storage medium of claim 11, the operations further comprising tuning the analysis with a tuning factor.

18. The non-transitory storage medium of claim 11, the operations further comprising performing a backup operation based on the consistency groups or the applications.

19. The non-transitory storage medium of claim 11, the operations further comprising identifying fingerprints within the access history, wherein the fingerprints include a delta logical block address and a delta operation type.

20. The non-transitory storage medium of claim 11, the operations further comprising creating a ranked list of a cumulative frequency distribution, which corresponds to a total percentage of IO per delta operation type.

* * * * *